June 8, 1937.  A. M. THOMSEN  2,082,989
PROCESS FOR THE EXTRACTION OF MAGNESIUM AND BROMINE FROM SEA WATER
Filed Aug. 29, 1934
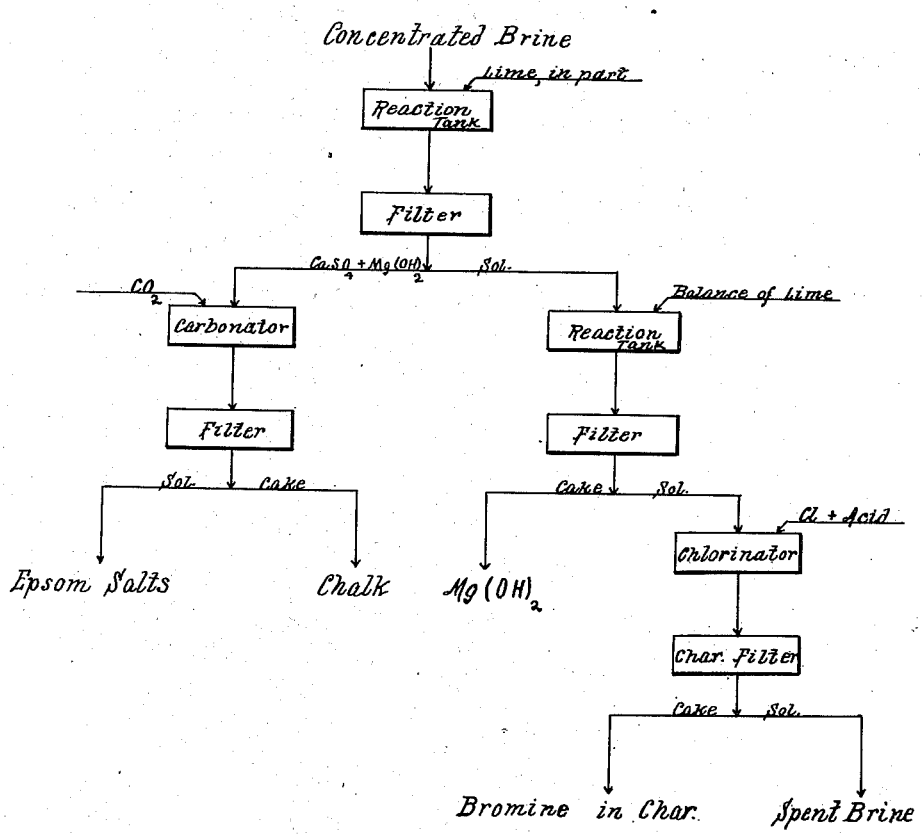
INVENTOR.
BY
ATTORNEYS.

Patented June 8, 1937

2,082,989

UNITED STATES PATENT OFFICE 2,082,989

PROCESS FOR THE EXTRACTION OF MAGNESIUM AND BROMINE FROM SEA WATER

Alfred M. Thomsen, San Francisco, Calif.

Application August 29, 1934, Serial No. 742,011

2 Claims. (Cl. 23—216)

The accompanying drawing is a flow sheet, illustrative of the process involved.

While the process about to be described may be used directly on sea water of a specific gravity of about 1.024, which is about the average the world over, and which, therefore, may be aptly called normal sea water, yet such process may be applied to better advantage to a more concentrated form of sea water, and even more advantageously to the "bitterns" from solar salt manufacture.

In favored spots there is, of course, no great expense involved in closing off an arm of the sea, or in putting a tidal gate into the entrance to a lagoon, and so obtaining any amount of sea water at any concentration desired; the difficulty arises when the further treatment of this concentrated sea water is to be considered.

Normal sea water has about the following composition:

| | Parts per 1,000 |
|---|---|
| Sodium | 10.26 |
| Chlorine | 18.95 |
| Magnesium | 1.36 |
| Calcium | 0.47 |
| Potassium | 0.60 |
| Sulphate (SO$_4$) | 2.79 |
| Bromine | 0.31 |

This composition corresponds to a salinity of about 3.5%.

For the purpose of understanding the part played by lime and sulphates in the reactions now to be described, it is convenient to consider first of all the relative proportions of lime and sulphate that enter into combination with one another to form calcium sulphate $$(CaSO_4.2H_2O),$$

a mineral occurring naturally as gypsum. Assuming for the moment that all the lime in sea water be combined with that portion of the sulphates required to form gypsum, and that the water of crystallization be also allowed for, sea water will then contain 2.1 parts per 1,000 of gypsum. This corresponds almost to the theoretical solubility of gypsum in water, but sea water is not quite saturated as the presence of the other soluble salts increases the solubility of gypsum.

As a preferred illustration, though, of course, not limiting myself thereby, I will now take sea water that has been evaporated to full saturation, i. e., until further evaporation will cause the separation of common salt. This stage will be reached when the concentration is about 10 to 1. In such solution gypsum has a much higher solubility than in plain water, the figure being 4.5 parts per thousand. If sea water containing 2.1 parts per thousand be concentrated to the 10 to 1 ratio, before mentioned, it theoretically would contain 21 parts per thousand, and as this is impossible it follows that about 75% of the gypsum separates as a precipitate. Natural evaporation of sea water in a lagoon, or on a brush-wood tower, or similar device (German, Gradier Hauser) will therefore result in a purification from lime and sulphates to the extent above described.

If to this sea water concentrate there be now added sufficient burnt lime to combine with the remainder of the sulphates excepting, of course, that present as calcium sulphate, then a further precipitation of calcium sulphate takes place,— the solution remaining saturated and all the added lime being found in the precipitate. Simultaneously, the chemical equivalent of the added lime in magnesium is also precipitated as magnesium hydrate. The precipitate is therefore a mixture of calcium sulphate and magnesium hydrate, and the slimy nature of the magnesia compound is so altered by the presence of the large percentage of calcium sulphate that it is readily filtered. It follows that this precipitation, and the subsequent filtration, leaves, as a filtrate, a highly purified sea water concentrate, free from both lime and sulphates, except in so far as the dissolved gypsum is concerned (4.5 parts per thousand).

A further addition of burnt lime to this purified sea water concentrate now results in nothing but the formation of a substantially pure precipitate of magnesium hydrate, as neither the sulphates nor resident lime can cause any interference. Of course, any soluble hydroxide may be substituted for lime in the just mentioned step, as no purpose is served by such addition except the precipitation of magnesium hydrate. Removal of this precipitate leaves a strong brine containing about 25% of common salt, about 3% of calcium chloride, and the small percentage of potash and bromine still resident therein. It is still, however, saturated with calcium sulphate (about ½%), and hence on evaporation will scale badly, but with top-heat this will cause no annoyance, and wherever it will pay it can be evaporated for its constituents.

From a commercial viewpoint, the most important ingredient in the brine just described is the bromine. If it is desired to extract only this element, I elect to proceed as follows: Sufficient chlorine gas is passed into the liquid to liberate the bromine, and as the brine reacts alkaline to phenol-thalein it is also acidified. The brine will be turned yellow in color by the liberated bromine, but if some form of activated carbon, be it bone-char or any of the more recent developments in decolorizers, be now introduced the color vanishes, and the bromine is absorbed, virtually quantitatively, in the carbon. It follows, therefore, that simple filtration of the yellow liquid through a char filter is sufficient to remove the bromine, which subsequently is removed from the char by simple distillation. (It is to be noted that the char is thus recoverable for re-use.) The high degree of purity of the brine acted upon, the entire absence of plankton, and other organic impurities, makes the consumption of both chlorine and char exceedingly small.

We return now to the precipitate of mixed calcium sulphate and magnesium hydrate, obtained in the first liming step, which is by no means a waste. It contains a great deal of adventitious impurity, depending upon the source of the sea water, and such impurity is both organic and inorganic. It precludes, of course, the use of the mixture or any of the orthodox uses of either calcium sulphate or magnesia, but it can be used directly, and very cheaply, as a source of Epsom salts (magnesium sulphate). If chimney gases, as the source of carbon dioxide, be passed into a suspension of these mixed ingredients double decomposition takes place, and the magnesium hydrate will go into solution forming Epsom salts, while the calcium sulphate becomes converted into calcium carbonate. Separation is now made between the insoluble impurities and chalk on the one hand, and the solution of Epsom salts on the other. This solution is next evaporated and crystallized, yielding Epsom salt in a high state of purity. The chalk sludge may be burned for lime once more, unless it contains too much inorganic sediment, such as clay, etc.

A modification of the process is suggested in the event that some cheap source of sodium sulphate be available. Salt cake, Glauber's salt, etc., are often the end products of some chemical reaction undertaken for some purpose, where such production of sodium sulphate is unavoidable. Only rarely can small quantities of sodium sulphate be sold, and it is generally thrown away. It will be self-evident that if enough sodium sulphate be added to the sea water concentrate to make a chemical balance with the lime and magnesia present in said water, and thus make up for the sulphate deficiency, then, on the addition of the requisite amount of lime, a precipitate will be formed, in which all the lime, magnesia, and sulphates originally resident, or afterwards added, will be found, save and except only the gypsum still dissolved in the residual brine. This brine will now consist solely of common salt, with ½% of gypsum, a little potash, and bromine as the only other constituents. The absence of the large amount of calcium chloride, which was found in the brine formerly described, makes it very easy to fit this brine to multiple effect evaporation; for, with the addition of a few pounds of soda ash, and the removal of the resultant precipitated chalk, the solution will be perfect for any evaporator. The salt will come out in absolute purity—the potash likewise—as no double salts need be feared in a sodium-potassium-chloride solution. From the mother liquor of this evaporation and crystallization bromine may be recovered by well known methods that need no description. The mixed precipitate of magnesium hydrate and calcium sulphate obtained as the result of the liming step would, of course, be carbonated, filtered, and evaporated for Epsom salts as before described—the chalk sludge being reburned if it is desirable.

I would have it understood that the term "sea water" used by me in the appended claims is intended by me to include normal sea water, concentrated sea water, and "bitterns", as indicated in the preamble.

I claim:

1. The herein described method comprising adding sufficient lime to sea water to combine with all the sulphates resident therein in order to produce a precipitate of said sulphates except calcium sulphate as calcium sulphate intermingled with the corresponding amount of magnesium hydrate the quantity of lime added being insufficient to remove the entire magnesium content; next removing said precipitate; next causing a further precipitation of magnesium hydrate by a subsequent addition of calcium hydroxide to precipitate the remaining magnesium in the residual brine; next removing said precipitate; next acidifying and chlorinating the remaining solution to liberate the contained bromine; and then absorbing said bromine in activated carbon.

2. The herein described method comprising adding sufficient lime to sea water to combine with all the sulphates resident therein in order to produce a precipitate of said sulphates except calcium sulphate as calcium sulphate intermingled with the corresponding amount of magnesium hydrate the quantity of lime added being insufficient to remove the entire magnesium content; next removing said precipitate; next carbonating said precipitate for the production of Epsom salts and returning the resultant calcium carbonate after burning to fresh sea water; next causing a further precipitation of magnesium hydrate by a subsequent addition of a calcium hydroxide to precipitate the remaining magnesium in the residual brine; next removing said precipitate; next acidifying and chlorinating the remaining solution to liberate the contained bromine; and then absorbing said bromine in activated carbon.

ALFRED M. THOMSEN.